US010118763B2

(12) United States Patent
Ramirez

(10) Patent No.: US 10,118,763 B2
(45) Date of Patent: Nov. 6, 2018

(54) COLLECTION CART AND METHOD OF USE

(71) Applicant: Mario R. Ramirez, Reno, NV (US)

(72) Inventor: Mario R. Ramirez, Reno, NV (US)

( * ) Notice: Subject to any disclaimer, the term of this patent is extended or adjusted under 35 U.S.C. 154(b) by 0 days.

(21) Appl. No.: 15/690,015

(22) Filed: Aug. 29, 2017

(65) Prior Publication Data

US 2018/0057260 A1 Mar. 1, 2018

Related U.S. Application Data

(60) Provisional application No. 62/380,574, filed on Aug. 29, 2016.

(51) Int. Cl.

*B62B 1/00* (2006.01)
*B62B 1/14* (2006.01)
*B62B 1/18* (2006.01)
*B65F 1/10* (2006.01)
*B65F 3/00* (2006.01)
*B65F 1/14* (2006.01)

(52) U.S. Cl.

CPC ............ *B65F 3/005* (2013.01); *B65F 1/1415* (2013.01); *B65F 1/1431* (2013.01); *B65F 1/1468* (2013.01); *B65F 1/10* (2013.01); *B65F 2240/138* (2013.01)

(58) Field of Classification Search

CPC ...... B65F 1/1415; B65F 3/005; B54F 1/1468; B62B 1/10; B62B 1/18; B62B 3/006
USPC ................. 248/98, 99, 101; 280/646, 49.35; 206/315.3, 315.7; 383/33; 220/404
See application file for complete search history.

(56) References Cited

U.S. PATENT DOCUMENTS

| | | | | |
|---|---|---|---|---|
| 246,667 | A * | 9/1881 | Draper | |
| 2,855,210 | A * | 10/1958 | Joyce | B62B 1/18 248/907 |
| 3,806,146 | A | 4/1974 | Shaw | |
| 3,992,034 | A | 11/1976 | Smith, Sr. et al. | |
| 4,138,139 | A | 2/1979 | Alfonso | |
| 4,160,557 | A | 7/1979 | Taylor | |
| 5,040,808 | A * | 8/1991 | McIntyre | B62B 1/18 248/129 |

(Continued)

OTHER PUBLICATIONS

International Search Report and Written Opinion of The International Searching Authority for International Application PCT/US17/49185, dated Nov. 16, 2017.

(Continued)

*Primary Examiner* — Tan Le
(74) *Attorney, Agent, or Firm* — Holland & Hart LLP

(57) ABSTRACT

An collection and method of use for collecting material, such as for example, waste, garbage, or other material. The collection cart includes an upper feed section spaced from a lower base section. The collection cart has and open side intermediate the upper feed section and lower base section. The upper feed section has a collection bag channel or tubular section through which a collection bag or other material collecting container can be inserted, with the upper end of the bag or container removably secured to the upper feed section. The bag or container can be removed from the upper feed section and removed through the open side, and the collection cart can be moved by grasping handles or other grippable structure space from each other and extending from the open side of the collection cart.

21 Claims, 11 Drawing Sheets

(56) References Cited

U.S. PATENT DOCUMENTS

| | | | | |
|---|---|---|---|---|
| 5,108,120 | A * | 4/1992 | Jarmusz | B62B 3/006 211/126.7 |
| 5,678,976 | A | 10/1997 | Rodriguez | |
| 6,082,574 | A | 7/2000 | Johnson | |
| 6,131,861 | A | 10/2000 | Fortier, Jr. et al. | |
| 7,222,825 | B2 | 5/2007 | Gilbert | |
| 7,866,679 | B1 | 1/2011 | Leon | |
| 8,128,115 | B2 | 3/2012 | Byrd | |
| 8,517,402 | B2 | 8/2013 | Davis | |
| 2007/0152411 | A1* | 7/2007 | Lox | B62B 1/18 280/47.17 |
| 2009/0032653 | A1 | 2/2009 | Gilligan et al. | |
| 2009/0290963 | A1 | 11/2009 | Hopkins | |
| 2010/0108826 | A1* | 5/2010 | Fernandez | B65F 1/10 248/98 |

OTHER PUBLICATIONS

HelgeNyberg AB; ESD Trolleys—ESD Refuse Bag Trolley; http://www.helgenyberg.com/products/trolleys/esdtrolleys/esdsopsacksvagn~p2105.

* cited by examiner

COLLECTION CART AND METHOD OF USE

CROSS-REFERENCE TO RELATED APPLICATION

The present application claims priority through the applicant's prior U.S. provisional patent application entitled COLLECTION CART AND METHOD OF USE, Ser. No. 62/380,574, filed Aug. 29, 2016, which provisional application is hereby incorporated by reference in its entirety. In the event of any inconsistency between that provisional application and the present non-provisional application, the present application shall prevail.

FIELD OF THIS SPECIFICATION

The present specification is directed to a yard or waste collection cart and method of use. More particularly, this specification is directed to such a carts to which a removable trash or material collection bag or container is mounted for placing trash or other material into the collection bag or container.

BACKGROUND OF SOME ASPECTS OF THE DISCLOSURE

Portable garbage containers have been popular for a very long time. One common type of portable garbage container is used to collect yard waste, such as tree leaves for example.

One common type of yard waste container provides a garbage bag support securing an open garbage bag spaced above underlying wheel structure. This type of container commonly requires the user to lift a filled garbage bag from and upwardly through the upper end of the garbage bag support in order to dispose of the garbage bag. This can be very difficult for many people to do because of the size or weight of the filled garbage bag.

Also when using this type of container, users frequently accidentally dump waste around the outside of the upper garbage bag opening and onto the ground below. This requires the user to again pick up the fallen waste and dump it into the garbage bag opening.

Often, use of a waste container results in uncollected waste nearby or on the waste container's top surface. This uncollected waste, such as food waste or decomposing leaves, can attract insects, rodents, and other types of animals and it can require substantial additional effort for the user to collect the waste, including by inserting it into the garbage or material collection bag.

Many prior art containers are large and difficult to manufacture, assemble, transport, dis-assemble, and store.

Many prior art containers provide no mechanism for supporting or, if desired, moving more than the trash bag support and mounted collection bag or other container when moving the container from place to place.

BRIEF SUMMARY OF SOME ASPECTS OF THE DISCLOSED AND OTHER EMBODIMENTS

The applicant believes he has discovered problems with prior art waste collection containers, container racks, and their use such as those identified above. He has therefore developed various solutions, including, in some embodiments, differing types of integrated solutions that can solve or reduce the scope of problems and issues such as those noted above.

One aspect of the present disclosure provides a portable or other collection cart that supports the upper end of a waste or material collection bag or container and allows for removal of the bag or container without the need to lift it through such support structure.

In some embodiments, the collection cart can be relatively easily assembled and disassembled. This can, in some applications, make the portable cart easier to maintain, repair, transport, and store.

Some applications provide a cart made at least in part or dominantly of relatively light weight materials such as plastic(s), composite(s), or lightweight metal(s), such as aluminum, for example. Other embodiments may include components that are heavier, such as wood, heavier or thicker metal(s), or other weightier materials, to more securely maintain the cart in a desired position.

Some applications provide a rectangular frame supporting an upper feed section having a passage or channel for a trash bag or other container. In some embodiments, this upper feed section is wider than the central trash passage, and in some instances, an upper surface on the upper feed section can be sloped downwardly towards the central passage. The slopped upper surface can allow trash to slide downwardly into a trash bag or container within and below the passage or channel in the upper feed section.

In some embodiments, the upper feed section of the collecting cart has clamps or other structure for securing one or more removable trash bags or other containers. In some embodiments, the clamps or other securing structure surround the bag or container passage or channel in the upper feed section, providing access to the interior of a bag or container through the passage or channel when a bag or container is mounted to the upper feed section.

In certain embodiments, the upper section of the cart can have a lip or other structure for attaching the upper end of collection bag or other container about or to the lip or other structure, in order to removably secure the collection bag or container in position on the cart.

In some embodiments, the supporting frame of the container cart is supported by one or more wheels or similar structure, which can enable users to more easily move the collecting cart. In some instances, the supporting frame provides lifting handles extending outwardly from the frame, providing easy grasping of the cart and allowing users to lift one side of the cart with respect to the ground and push or pull the cart along the underlying surface, such as the ground for example.

In some embodiments, the collecting cart provides a frame that has an open side, such as, for example, between cart handles, for easy removal of the trash bag without lifting it through the trash bag passage in the upper section of the cart In some embodiments, the collecting cart can provide a frame that includes additional components, such as, for example, mounting hooks or arms for trash pick-up pails or a lower support surface for supporting the lower portion of a bag or other container mounted within the passage or channel in the upper feed section.

Other aspects of this disclosure include novel methods of use of a collection cart. One method referenced above allows removal of a garbage bag without having to lift it out of the upper end of the garbage support structure. In some embodiments, the one or more downwardly sloped upper surfaces surrounding the garbage bag opening catch downwardly falling garbage outside of the perimeter of the garbage bag opening and causes (by gravity feed) or aids user or other movement of such garbage into the garbage bag opening.

There are many other novel features and aspects of this disclosure. They will become apparent as this specification proceeds. In this the regard, the scope of the invention is to be determined by the claims as issued and not by whether the subject matter provides or addresses an issue or feature identified in the Background or Brief Summary sections of this specification.

BRIEF DESCRIPTION OF THE DRAWINGS

The inventors' preferred and other embodiments are described in association with the accompanying Figures in which.

DETAILED DESCRIPTION OF SOME EMBODIMENTS

The prior Brief Summary and the following description provide examples, and are not limiting of the scope of this specification. In addition, there are novel aspects of this disclosure that do not necessarily address issued noted in the Background above.

One skilled in the art would recognize that changes can be made in the function and arrangement of elements discussed without departing from the spirit and scope of the disclosure. Various embodiments can omit, substitute, add, or mix and match various procedures or components as desired. For instance, the methods disclosed can be performed in an order different from that described, and various steps can be added, omitted, or combined. Also, features disclosed with respect to certain embodiments can be combined in or with other embodiments as well as features of other embodiments.

Figure 1:
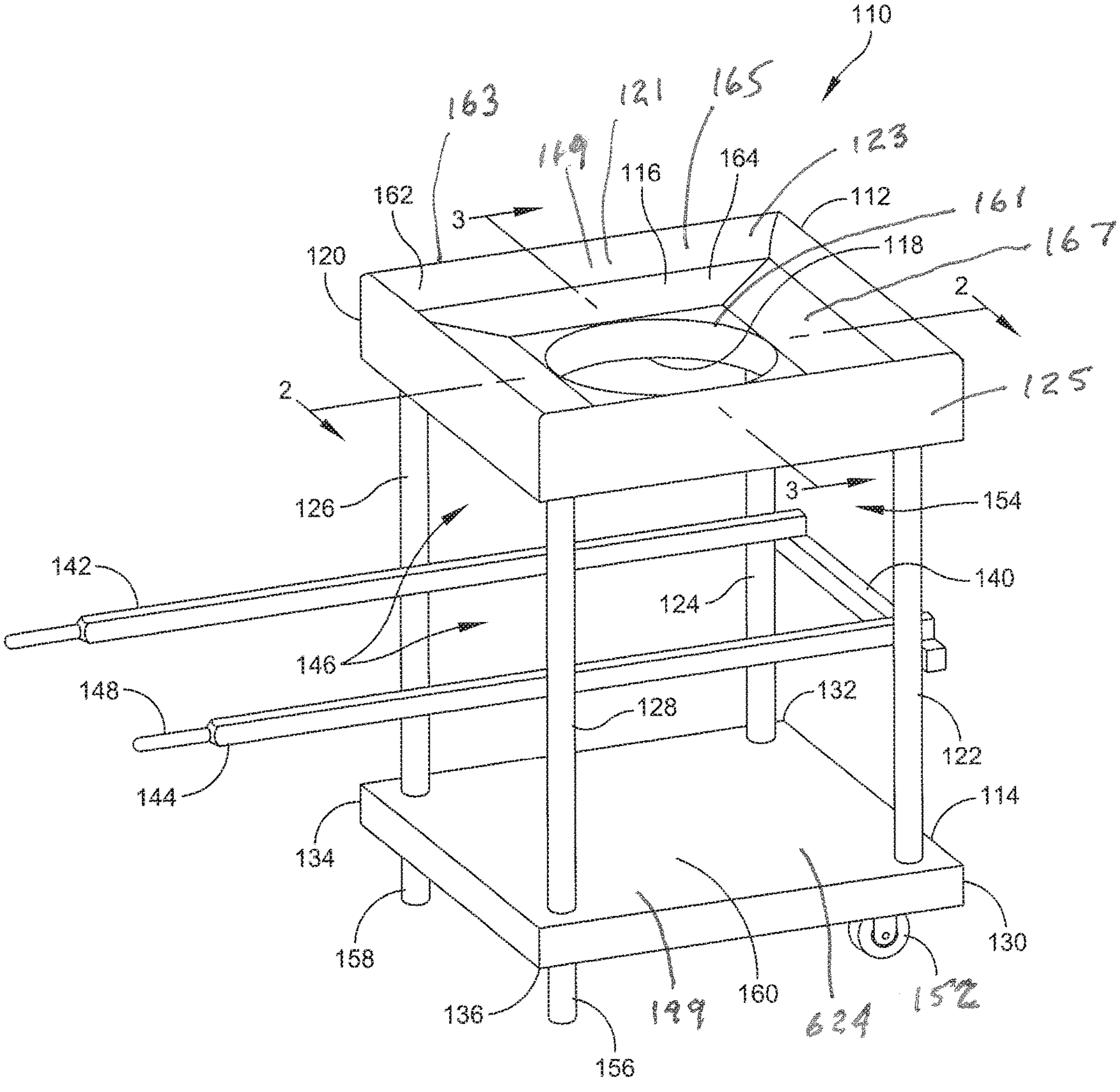
FIG. 1 is perspective view of a modular, collapsible, portable collecting cart having a slopped top surface, a flat lower surface, and two wheels mounted on the bottom of the lower surface and two handles.

Referring now to FIG. 1, one embodiment of a modular, collapsible, portable collecting cart, generally 110, has a rectangular upper feed section 112 spaced from a rectangular lower base section 114. The upper feed section 112, has an upper surface 116 with a central tubular passage 118 that provides a garbage bag mounting passage between the upper surface 114 and a lower surface (not shown in FIG. 1) on the underside of the upper feed section 112.

Four collection bag clamps (not shown in FIG. 1) can be mounted, with fasteners, on the upper surface 116 of the upper feed section 112. Each clamp is spaced laterally from the central tubular passage 118 toward an adjacent corner, e.g., 120, of the upper feed section 112. Alternatively, collection bag clamps can be mounted laterally spaced from the central tubular passage 118 toward or at the middle section, e.g., 119, of each adjacent more steeply sloped portion 121, of each of the four sides, e.g., 123, of the upper feed section 112. In each case, the four clamps are thus located at 45° from each other about the axial center of the central tubular passage 118.

The upper feed section 112 is secured to the upper ends of four elongated support poles 122, 124, 126, 128 respectively, extending from the interior side (not shown in FIG. 1) of the upper feed section's 112 four corners respectively. In typical use, the poles 122, 124, 126, 128 extend vertically downwardly from the upper feed section 112, and the lower ends of the poles 122, 124, 126, and 128 are secured to the transversely extending lower base section 114 adjacent its four corners respectively, e.g., 130, 136, and 134, for poles 122, 128 and 126, respectively. A somewhat U-shaped stabilizer bracket 140 is connected to the midpoint of the four poles 122, 124, 126, 128 perpendicularly to the poles 122, 124, 126, 128. Opposed ends 120, 121 of the bracket 130 extend laterally outwardly from the front side 146 of the cart 110. The opposed ends 142, 144, each include a cart-lifting handles, e.g., 148.

Two rotatable support wheels 150, 152 (150 not shown FIG. 1) are removably mounted to the lower surface of the lower base section 114 of the cart 110 below the lower ends of the two right side support poles 122, 124 at the back side 154 of the cart 110. Lower support ends 156, 158 of the front-side poles 126 and 124 extend downwardly from the lower base section 114.

The upper open end of a material collecting bag (not shown in FIG. 1), such as a trash bag, can be secured to the cart 110, with the bag's top end open about and abutting the central tubular passage 118, by the four clamps on the upper feed section 112, with the body of the bag passing though the central tubular passage 118 toward and, if desired, abutting and supported by, central portion 160 of the lower base section 114. In order to maximize collection of material per collecting bag and stabilize the bag as well, the collecting bag has a length larger than the distance between the upper surface. When full of collection material, the collecting bag can be released from the clamps, closed at the bag's top end, and then simply allowed to fall through, or otherwise be removed through, the unblocked front side 146 of the cart 110.

The upper feed surface 116 of the upper feed section 112 has an upper and lower slanted section 162, 164, respectively. Each of the four upper slanted feed surfaces, e.g., 165, in the upper slanted section 162, is slanted inwardly downwardly, at a relatively high angle (e.g., at 10 to 80 degrees, and specifically for example, 60 degrees) to the plane of the upper circular edge 161 of the central tubular passage 118, from the four upper side edges, e.g., 163, of the upper feed section 162 toward the central tubular passage 118. Each of the four lower slanted feed surfaces, e.g., 167, in the lower slanted section 164, is slanted inwardly downwardly, at a relatively lower angle (e.g., at 3 to 50 degrees, and specifically for example, 5 degrees) to the plane of the upper edge 161 of the central tubular passage 118, and extends from the lower laterally extending edge of the adjacent upper slanted feed surface 162 toward the upper edge 161 of the central tubular passage 118.

The upper and lower slanted sections 162, 164 cooperatively provide a catch-and-gravity-feed surface for waste or other material intended to be dumped into the associated collection bag referenced above. The slanted sections 162, 164 allow the caught material to slide down them into or adjacent the bag, so that the user can easily brush and remaining material on them into the bag.

Yet other and/or additional bag collection securing structure can be implemented on or in conjunction the upper feed section 112. For example, the upper feed section 116 may be sized so that the upper end of a mating garbage bag (not shown in FIG. 1) can removably securely surround the outer periphery 125 of the upper feed section 112. In this fashion, the upper section of the mating, flexible garbage bag can conform to the upper surface 116 of the upper feed section 112 and thus facilitate gravity feeding of waste, garbage, etc., from are area above the upper surface 116 through and into the central portion of the garbage bag penetrating and below the central tubular section 118 of the upper feed section 112.

Similarly, the upper feed section 112 may have differing configurations of its external side periphery, such as a circular, tubular, of oblong, or partially-circular, -tubular, or -oblong, rather than rectangular, outer side periphery 127 shown in FIG. 1. In some embodiments, such an upper feed section 112 peripheral side structure may be easier to secure certain waste collection bags or containers in position with respect to the upper feed section 112, with body of the bag or container penetrating and retained under the upper tubular passage 118.

Figure 2:
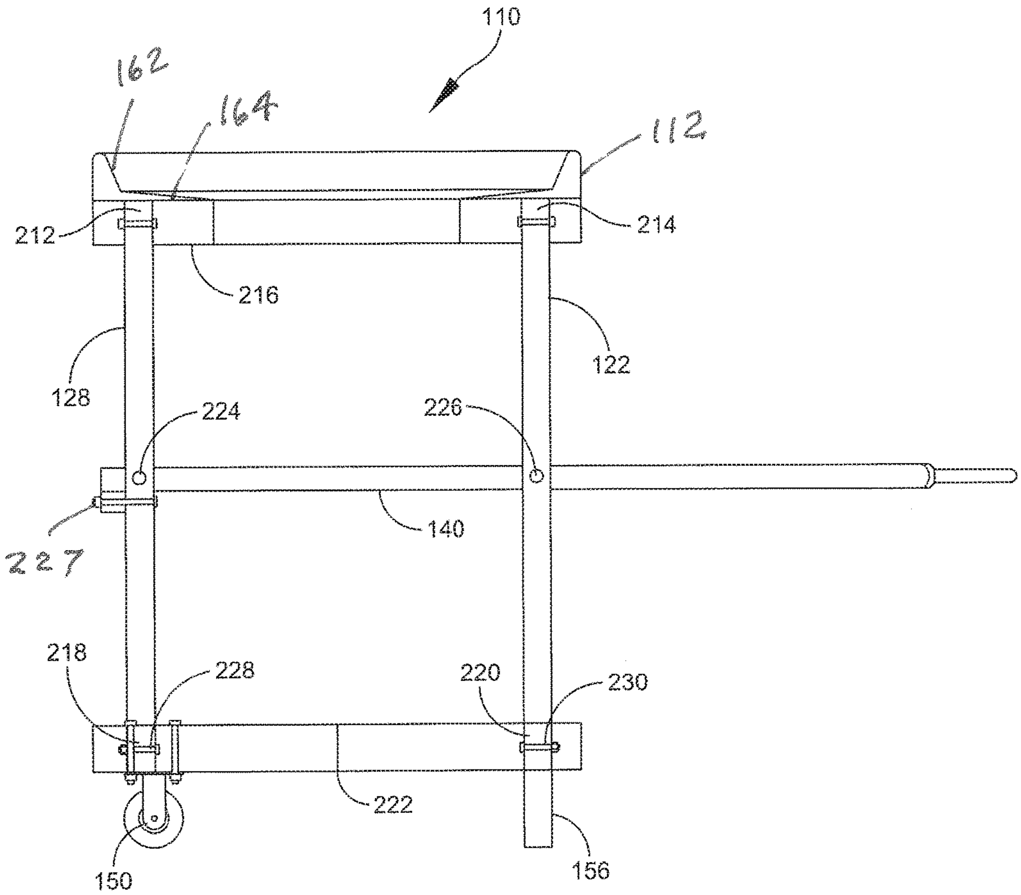
FIG. 2 is a cross-sectional view taken along section line 2-2 of FIG. 1.

With reference now to FIG. 2, the upper ends 212, 214 of the right side supporting poles 128, 122, respectively, penetrate the upper feed section 112 through 33 the underside 216 of the upper feed section 112. The lower ends 218, 220 of the right side support poles 128, 122, respectively, penetrate mating pole mounting passages (not shown in FIG. 2) in the lower base section 114. Front side support pole 122 extends from its associated pole mounting passage (surrounding lower end 220) in the lower section 114 downwardly toward the ground (not shown) so that the opposed wheel 158 (not shown in FIG. 2) and lower end 156 of the front side support pole 122 cooperatively support the lower base section 114 horizontally spaced from and above the ground. Rear side pole 128 penetrates the lower base section 114 so that the lower end 218 of the rear side pole 128 is flush with the underside 222 of the lower base section 114. All front and rear side poles, e.g., 122, 128, respectively, are removably secured in position in the lower base section 114 by removable carriage bolts, e.g., 230 and 228, respectively.

The somewhat U-shaped support bracket 140 is connected to the supporting poles, e.g., 128, 122, by removable fasteners, e.g., 224, 226, 227. This mid-supporting-pole connection provides additional rigidity to the cart 110.

In some embodiments (not shown), the removal of the pin and fasteners, e.g., 224, 224, allows the U-shaped support bracket 140 to be removed from the poles, e.g., 128, 122, respectively, which in turn allows the remaining cart frame to be folded and collapsed into a smaller unit. In the FIG. 2 embodiment, however, the cart 110 can be disassembled into its constituent parts (e.g., 112, 114, 122, 124, 126, 128, 140, 150, 152) by removal of associated removable fastening pins (e.g., 224, 226, 228, 230), and other removable fasteners. Further, the stabilizing bracket 140 can also be broken down, as described below.

Figure 3:
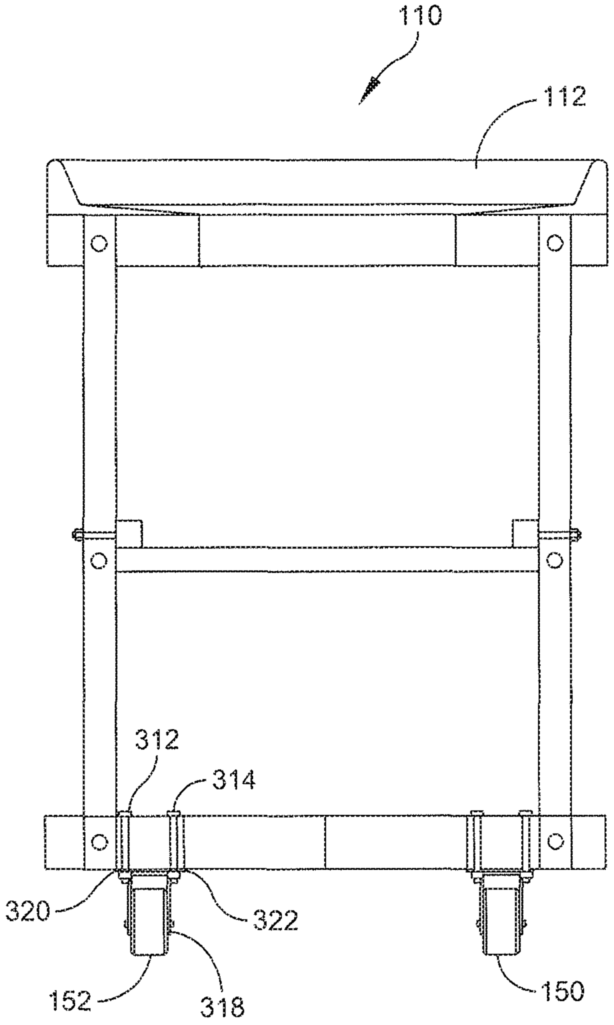
FIG. 3 is a cross-sectional view taken along section line 3-3 of FIG. 1.

With reference now to FIG. 3, each of the two wheel casters, e.g., 152, have two opposed wheel supports 312, 314 securing a wheel 318 between them. The wheel supports extend upwardly from the wheel 318 to abut the lower base section 114.

Figure 4:
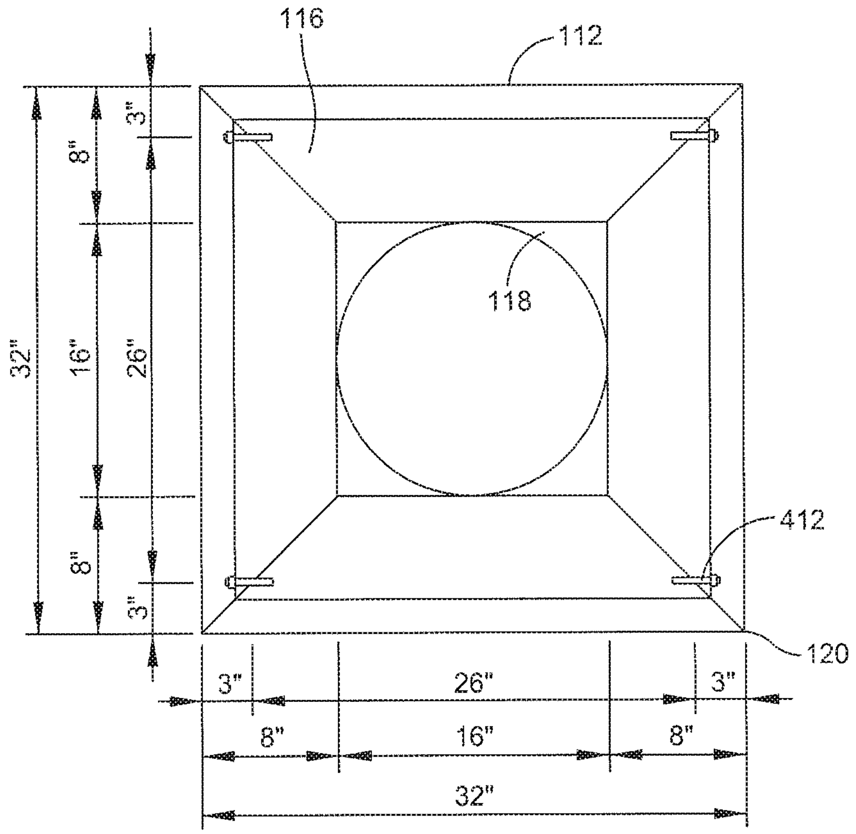
FIG. 4 is a plan view of the upper feed section of collecting cart of FIG. 1.

With reference now to FIG. 4, adjacent each of the four corners. e.g., 120, of the upper feed section 112, a removable carriage bolt, e. 412, penetrates a mating carriage bolt passage (not shown in FIG. 4) passing from the upper feed surface 116 through the underside (not shown in FIG. 4) of the upper feed section 112. Each such carriage bolt, e.g., 412, threads into a mating threaded passage (not shown in FIG. 4) in the associated upper end of the support pole (not shown in FIG. 4) abutting the carriage bolt passage penetrated by the carriage bolt, e.g., 412.

Figure 5:
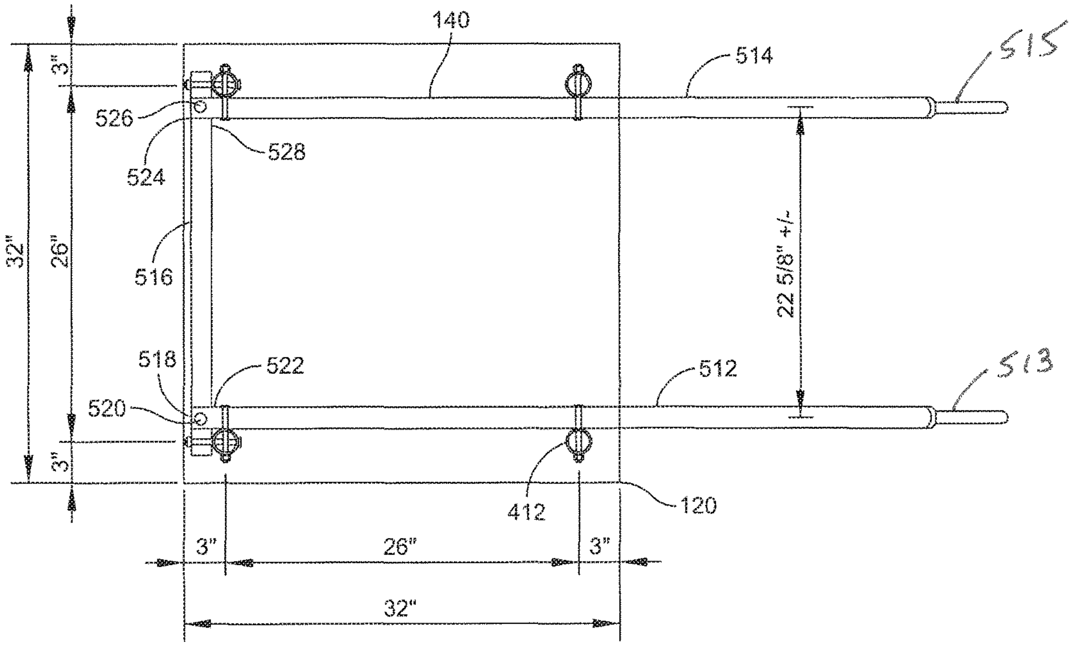
FIG. 5 is a partial plan view of the stabilizing bracket of the collecting cart of FIG. 1, showing the lower base section in phantom below the stabilizing bracket.
Figure 6:
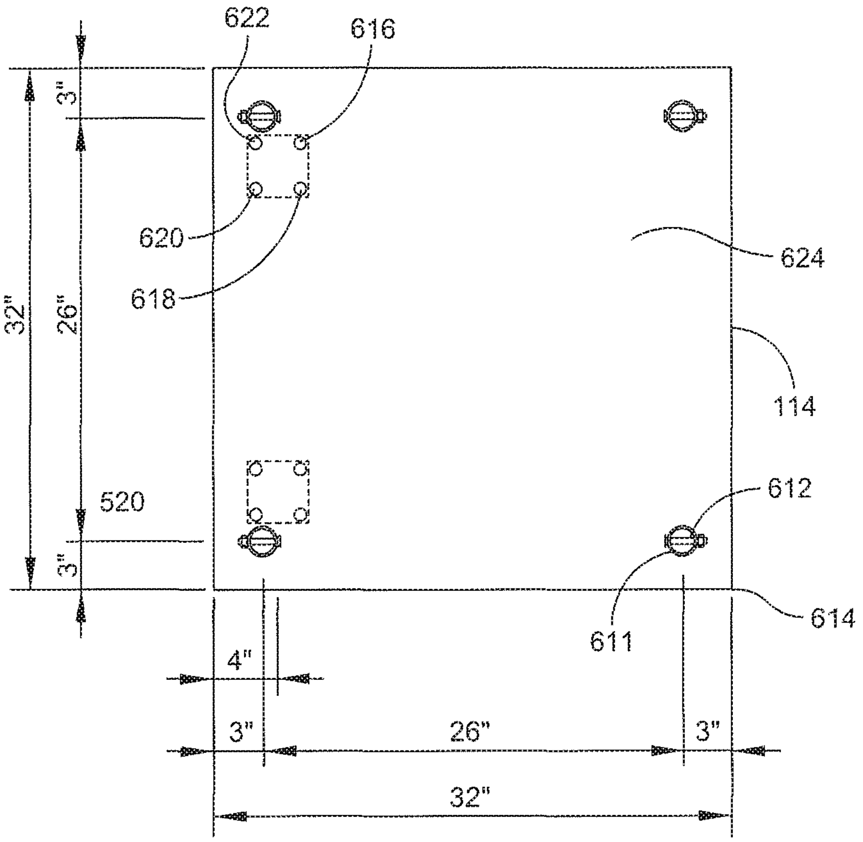
FIG. 6 is a plan view of top side of the lower base section of the collecting cart of FIG. 1.

FIGS. 4 through 6 set forth exemplary dimensions. These dimensions may vary from up to plus or minus 70%, and the locations of, spacing between, the opposed left and right arms 512, 514 may be varied with respect to their mounting or fastening to the upper feed section in order to provide the desired spacing between the opposed handles 513, 515 of the cart.

Referring to FIG. 5, the stabilizing bracket 140 has a parallel, opposed left and right arms 512, 514, respectively, and an interconnecting rail 516 with (i) a left end 518 connected by a removable fastener 520 to the mounting end 522 of left arm 512, and a (ii) a right end 524 connected by a removable fastener 526 to the mounting end 528 of the right arm 514. The removable fasteners allow the stabilizing bracket to be disassembled into its constituent parts (512, 514, 516, and associated fasteners).

With reference to FIG. 6, the lower base section 114 also has four support pole mounting passages, e.g., 611, adjacent each corner, e.g., 614, of the lower base section 114. Carriage bolts, e.g., 612, adjacent each corner, e.g., 614, penetrate a mating lower base carriage bolt passage (not shown in FIG. 6) to penetrate a mating threaded passage in a pole (not shown in FIG. 6). The lower base section 114 further provides two groups of four fastener passages, e.g., 616, 618, 620, 622, for mounting the caster wheels (not shown in FIG. 6) to the underside (not shown in FIG. 6) of the base section 114.

Other types of wheels may be substituted in place of caster wheels or added to the collection cart having any caster wheels. Other such wheels may be inflatable wheels, non-inflatable wheels, or others.

The embodiment of FIGS. 1-6 can be made of plastic, composite, metal, or any other suitable material, along with fasteners and caster wheels. Similar structures can be easily made of wood. The composition material of components may be mixed and matched to provide differing objectives for the resulting cart, such as durability, resilience, weight, and portability.

For example, with reference now to FIG. 1, the lower base section 114 can have an upper base surface 199 that is sufficiently stiff and strong to support either (i) the lower end of a trash or other container that may rest upon the upper base surface 199 or (ii) other structure, such as a sand bag or metal weight or plate, in order to secure the cart 110 in position, such as for example, during windy conditions. Further, a metal or other type of plate or structure (not shown) may be secured to the upper surface 624 of the lower base section 114, such as by removable or fixed fasteners, adhesive, or mere resting of the plate on the lower base section 114, in order to provide sufficient stiffness and strength to the lower base section in conjunction with the metal plate.

If made of plastic, most of the components (e.g., other than the caster wheels and, optionally, the fasteners and clamps) can be injected molded for example. A dominantly plastic cart 110 can be lightweight, weighing from 15 to 75 pounds. As noted above, additional weight can be added, such as when the cart is assembled locally, by procuring and securing (such as by fasteners or adhesive) metal or other plates or structures to portions of the cart.

Figure 7:
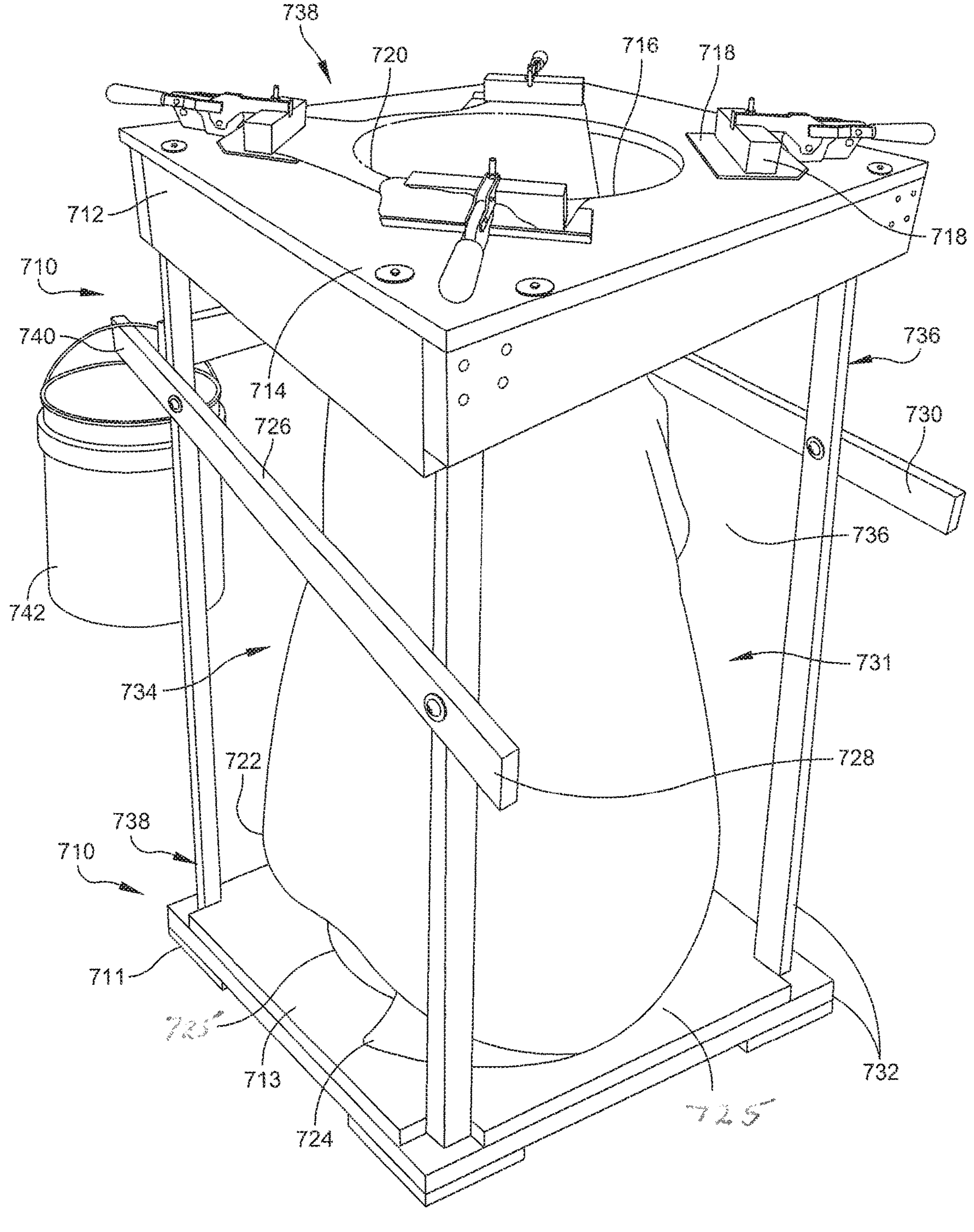
FIG. 7 is perspective view of an alternative collecting cart made dominantly of wood and garbage bag clamps.

With reference to FIG. 7, an alternative collection cart 710 is dominantly made of wood and metal as shown. Other material, such as plastic or composite material for example, may be substituted as desired.

This type of cart 710 may or may not include wheels (not shown in FIG. 7) mounted to the bottom side 711 of a rectangular base section 713 of the cart 710. The collection cart 710 has a rectangular upper feed section 712 with a planar upper surface 714 extending radially outwardly from a central collection bag passage 716. Four heavy duty bag retainer clamps, e.g., 718, are mounted on the upper surface 714 and are adjustable to (i) clamp the open end 720 of a large garbage bag 722 in position about the central circular bag passage 716 or (ii) release the bag's 722 open end 720 if desired. The bag bottom 724 is supported in the central upper surface 725 of the base section 713.

Figure 8:
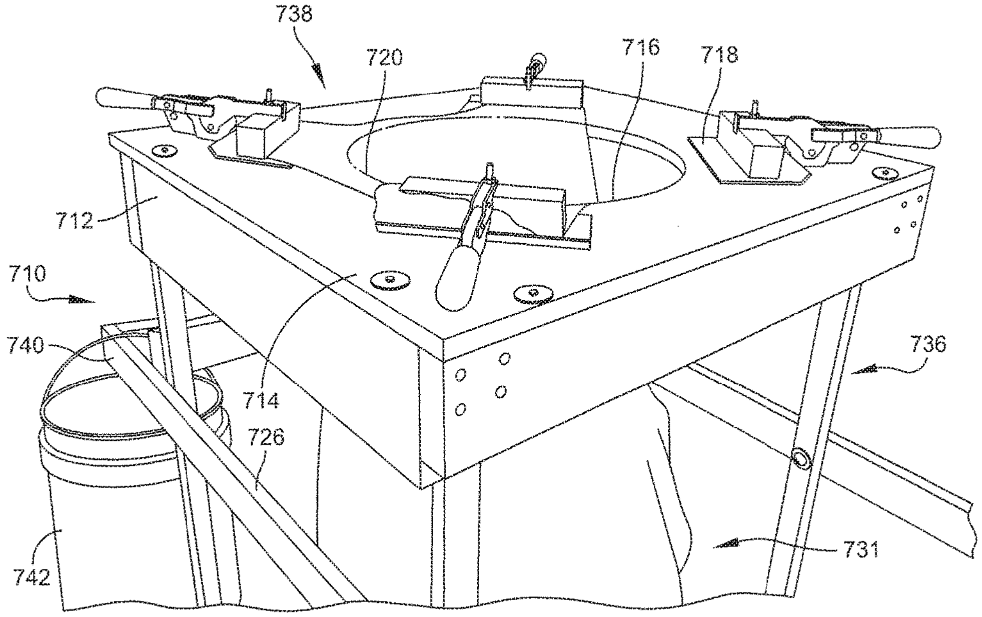
FIG. 8 is a partial perspective view of the collecting cart of FIG. 7 showing a garbage bag partially mounted in the central upper garbage opening and garbage bag clamps mounted about the opening to clamp the upper, open end of a garbage bag about the upper end of the opening.
Figure 9:
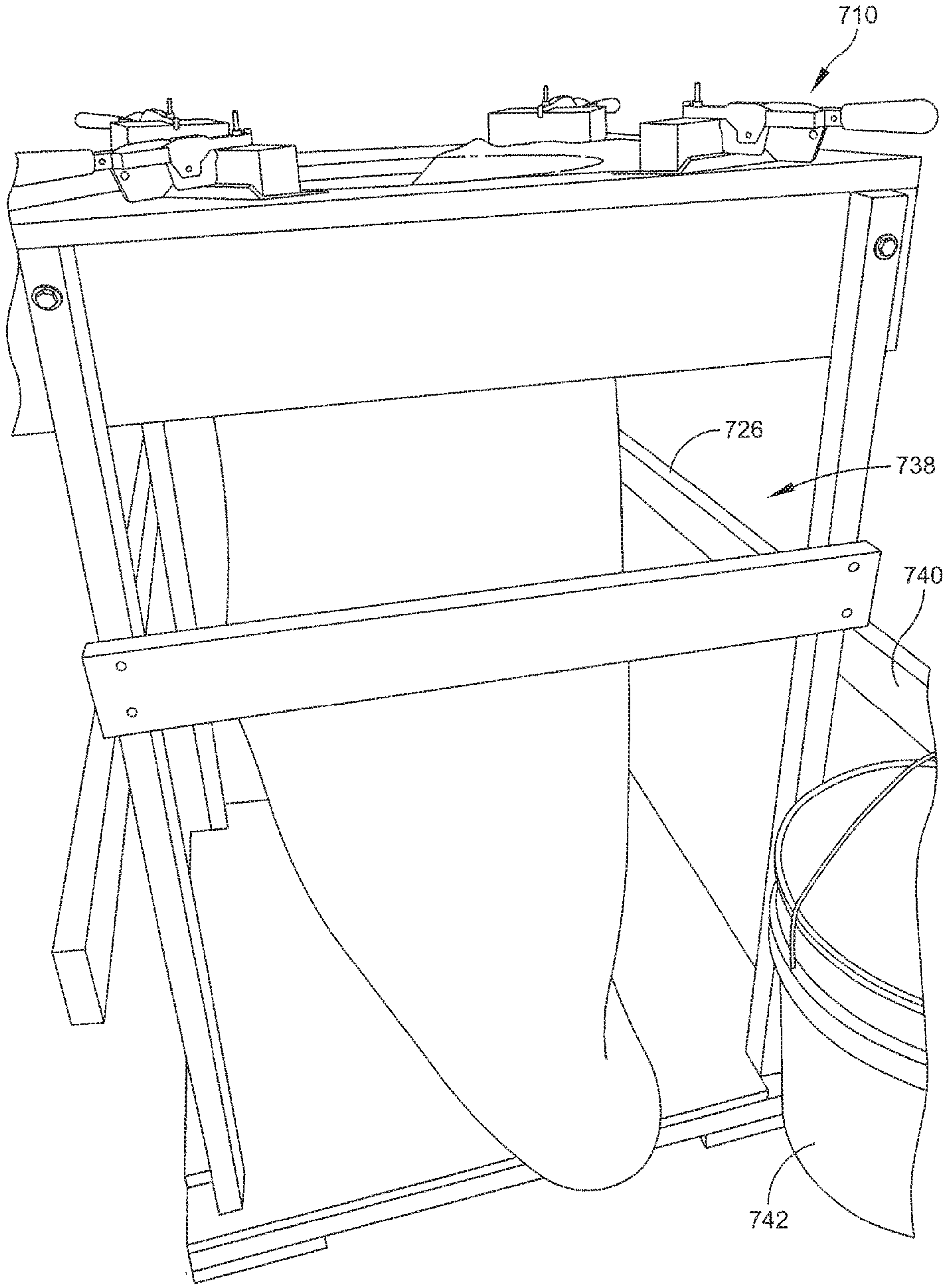
FIG. 9 is a back side view of the collecting cart of FIG. 7 showing apparatus mounting arms extending from the frame of the collecting cart.

With reference to FIGS. 7, 8, and 9, this collection cart 710 has a somewhat H-shaped stabilizing bracket 726 with opposed, parallel left and right arms 728, 730 extending (i) outwardly from the open front side 731 central cart frame 732, (ii) along the left and right sides 734, 736, respectively, of the cart. 710, and (iii) outwardly from the back side 738 of the cart 720. This four outwardly extending arms, e.g., 740, provide structure on which work pails (e.g., 742), tools, and other accessories (the latter two not shown) may be mounted. The two opposed arms 728, 730 extending laterally outwardly from the open front side 731 may also provide handles or other grippable structure 728, 730 so that the collection cart 710 may be moved by manipulation of, and pushing or pulling on, the handles or grippable structure 728, 730.

Figure 10:
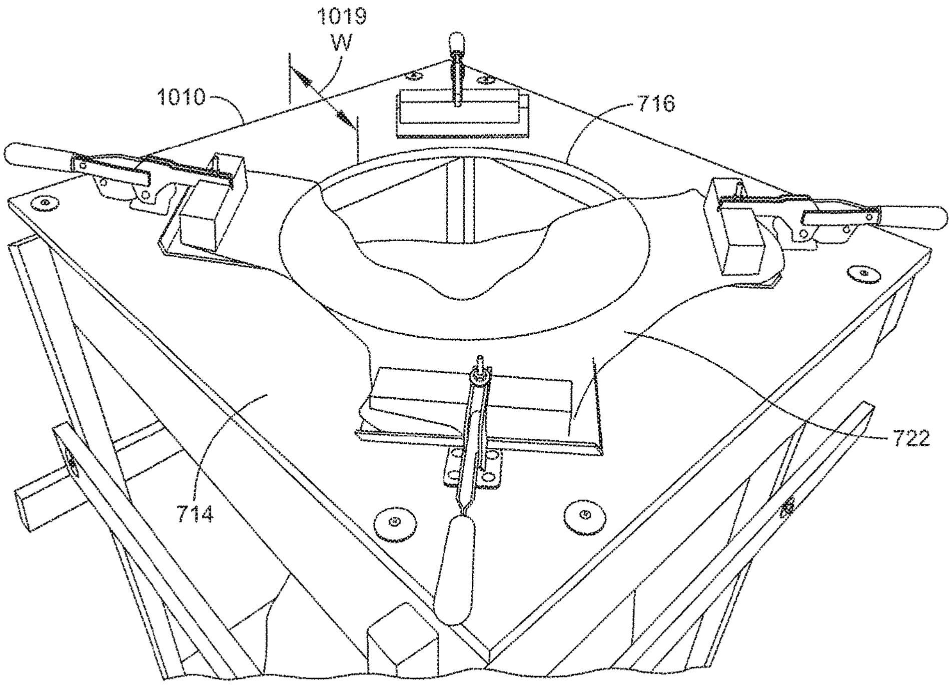
FIG. 10 is a perspective view of the upper end of the collecting cart of FIG. 7 showing the upper end providing a surface surrounding, and extending radially outwardly from, the upper opening of the garbage bag mounted in the central garbage bag opening in the upper end.
Figure 11:
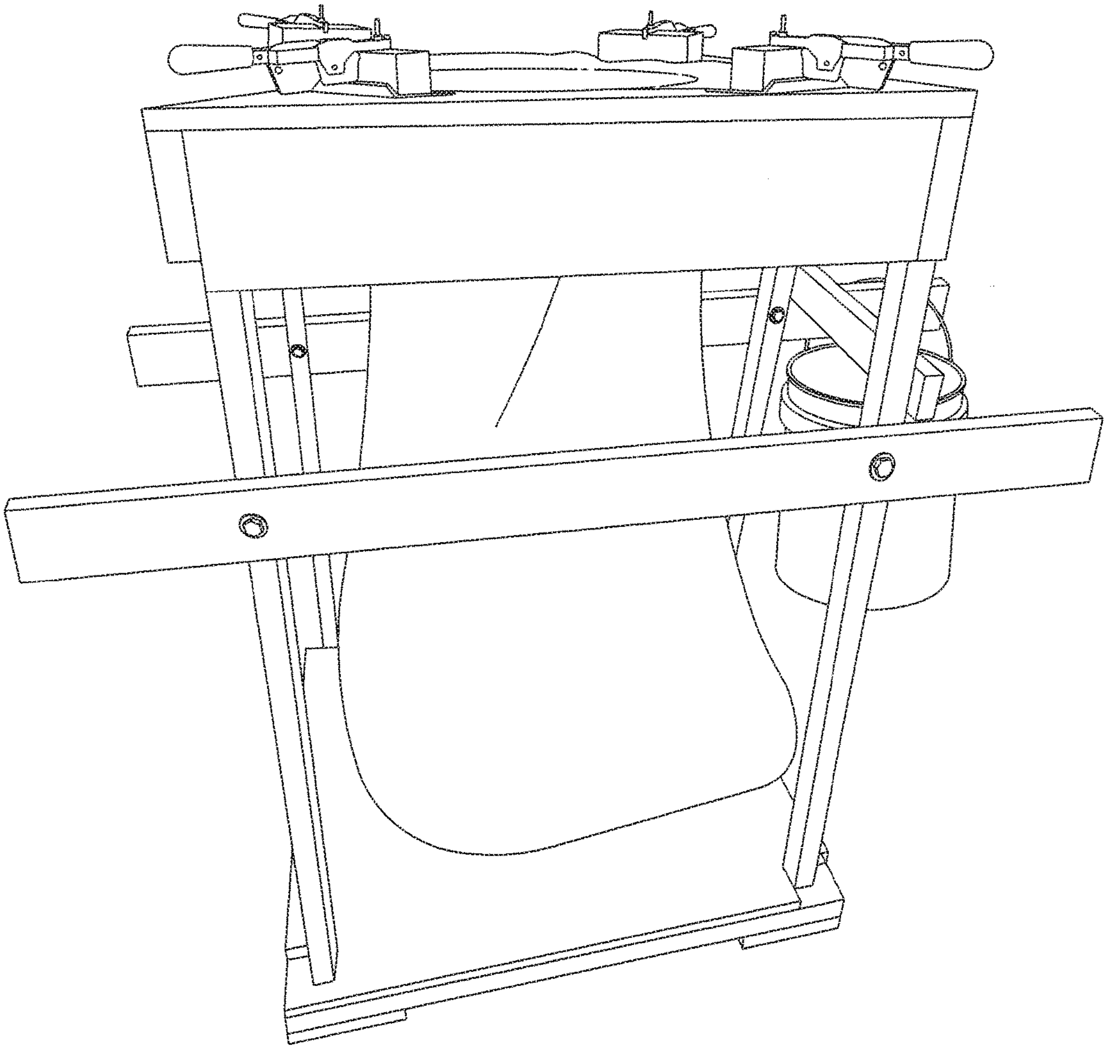
FIG. 11 is a side view of the collecting cart of FIG. 7 showing user handle and support arms extending outwardly from the cart frame.

With reference to FIG. 10, the width 1019W of the upper surface 714 from the central bag passage 716 to the edge 1010 of the upper feed section 712, is 5½ inches. This distance may be any desired distance. The applicant believes this distance may suitable range from 2 to 8 inches, or if desired, even from 2 to 12 inches.

The width of the bag passage 716 is wider than the width of a pail (such as pail 742 in FIG. 7). The user may thus more easily dump the pail contents (not shown) into the bag 722 without concern that, if dropped or otherwise, the pail 742 will not pass through the bag passage 716.

With reference now to FIGS. 1 and 7, the front sides 146 and 731 of the two depicted embodiments in these Figures provide and collection bag passage through which a collection bag, e.g., 722 in FIG. 7, may be removed after the upper section of the bag 722 is released from being mounted or secured to the associated upper feed sections, 112, 712, respectively.

It is to be understood that embodiments of the collection cart may or may not be easily disassembled. In this regard, fastening may be accomplished without use of removable fasteners, such as with adhesive(s) or nails when appropriate for the component material involved.

The method of use of these carts can be as follows:

A. if not assembled, assemble the collection cart and locate it as desired by use of the opposed handles or other grippable structure at or somewhat adjacent the collection cart's laterally opposed left and right sides forming the open front side of the collection cart;

B. mount a collection bag to the collection cart by either:
   - inserting the lower- and mid-sections of the collection bag from the top of central tubular passage through the lower end of the tubular passage; or
   - doing the reverse and inserting the upper-end of the collection bag from the bottom of the central tubular passage through upper end of the tubular passage;

C. removably secure the upper end of the collection bag to the upper feed section;

D. dump waste, garbage, or other material as desired into the collection bag;

E. fill the collection bag as desired;

F. before, during, or after steps D and E, move the collection cart as desired such as grasping the opposed handles or other grippable opposed ends of the generally U-shaped stabilizer brackets in the collection cart;

G. disconnect the upper end of the collection bag from the upper feed section;

H. if, desired, close the upper end of the collection bag such as, in certain embodiments, by pulling on one or more ties in the upper end of the collection bag and tying off the one or more ties to accomplish the desired closure;

I. if desired, push the closed upper end of the collection bag through the central tubular section in the upper feed section;

I. remove the collection bag from the cart through the open front side of the collection cart; and J. if desired, disassemble the collection cart as desired, and if desired, store the collection cart in dis-assembled or collapsed format.

The collection cart may be used in other ways as well. For example, it can be used to move materials other than collection bags, pails, or container, such as anything that can be mounted to the upper side of the base section. Straps or ropes may my mounted to surround the, or portions of the, lower structure of the collection cart adjacent the areas in which such other materials may be mounted on the base section, in order to retain such other material(s) on the base section when the collection cart is moved such as by, for example, lifting its handles or grippable structure to lift the open front side of the collection cart and move it.

The collection cart may be structured differently in yet other aspects. For example, the collection cart can include solid back and side panels along with opposed side panels to which, or adjacent to which, if desired a panel door may be attached, providing access, when opened, to a front opening in the front side. Such panels can prevent wind, rain, or animals from gaining undesired access to the interior of the collection cart.

Yet additional structures may be added to the collection cart. For example, further hooks, straps, and other structures can be added in order to removably mount tools as desired to the cart. Such hooks straps or other structures could be mounted, for example, to the interior or exterior of the U- of H-shaped stabilizer bracket.

The foregoing detailed description has described some specific embodiments. However, the illustrative discussions above are not intended to be exhaustive or to limit the invention to the precise forms disclosed. On reading this specification, those of skill in the art will recognize that many of the components discussed as separate units may be combined into one unit and an individual unit may be split into several different units.

While the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "a" or "an," as used in the specification and claims, are to be construed as meaning "at least one of" In addition, for ease of use, the words "including" and "having," as used in the specification and claims, are interchangeable with and have the same meaning as the word "comprising." Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C)

Finally, any ranges stated above include all sub-ranges within the range.

What is claimed is:

1. A portable collection cart comprising in combination:

A. a cart frame having:

an upper feed section having collection bag passage extending from an upper surface of the upper feed section to a lower surface of the upper feed section;

a lower base section;

at least three feed section support arms extending transversely from and between the lower base section and the upper feed section; and a stabilizer bracket mounted to each of the support arms transverse to the support arms and having opposed stabilizer bracket arms extending transversely outwardly from two adjacent feed section support arms, the two opposed feed section support arms, upper feed section, and lower base section cooperatively providing an open front side of the cart frame with the two adjacent support arms extending outwardly from the two opposed support arms at the opposed sides of the open front side of the cart frame; and B. at least a first wheel extending from an underside of the lower base section;

wherein an upper material collection surface of the upper surface has a first material collection section at a first angle to the plane of the upper end of the collection bag passage and a second material collection section at a second angle to the plane of the upper end of the collection bag passage, the first angle being at least three degrees greater than second angle and thee second material collection section abutting the upper end of the collection bag passage.

2. The portable collection cart of claim 1 wherein the upper feed section includes means for securing a collection bag to the upper feed section with the lower portion of the collection bag passing through the collection bag passage to rest intermediate the upper feed section and lower base section.

3. The portable collection cart of claim 1 wherein the upper feed section includes a plurality of collection bag clamps on the upper surface of the upper feed section.

4. The portable collection cart of claim 1 wherein the upper feed section has an external outer periphery to which an upper portion of a collection bag may be mounted.

5. The portable collection cart of claim 1 having a plurality of wheels extending from the underside of the lower base section.

6. The portable collection cart of claim 2 having a plurality of wheels extending from the underside of the lower base section.

7. The portable collection cart of claim 1 wherein the upper feed section and lower base section each have a rectangular outer periphery and the cart frame has at least four feed section support arms, each extending from the upper feed section adjacent an associated corner of the upper feed section.

8. The portable collection cart of claim 2 wherein the upper feed section and lower base section each have a rectangular outer side periphery and the cart frame has at least four feed section support arms, each extending from the upper feed section adjacent an associated corner of the upper feed section.

9. The portable collection cart of claim 6 wherein the upper feed section and lower base section each have a rectangular outer periphery and the cart frame has at least four feed section support arms, each extending from the upper feed section adjacent an associated corner of the upper feed section.

10. The portable collection cart of claim 1, wherein the upper material collection surface extends from the collection bag passage to the outer side periphery of the upper feed section.

11. The portable collection cart of claim 2 wherein the upper surface of the upper feed section includes at least an upper material collection surface extending from the collection bag passage to the outer side periphery of the upper feed section.

12. The portable collection cart of claim 6 wherein the upper surface of the upper feed section includes at least an upper material collection surface extending from the collection bag passage to the outer side periphery of the upper feed section.

13. The portable collection cart of claim 9 wherein the upper surface of the upper feed section includes at least an upper material collection surface extending from the collection bag passage to the outer side periphery of the upper feed section.

14. A portable collection cart comprising in combination:

A. a cart frame having:

an upper feed section having collection bag passage extending from an upper surface of the upper feed section to a lower surface of the upper feed section;

a lower base section;

at least three feed section support arms extending transversely from and between the lower base section and the upper feed section; and a stabilizer bracket mounted to each of the support arms transverse to the support arms and having opposed stabilizer bracket arms extending transversely outwardly from two adjacent feed section support arms, the two opposed feed section support arms, upper feed section, and lower base section cooperatively providing an open front side of the cart frame with the two adjacent support arms extending outwardly from the two opposed support arms at the opposed sides of the open front side of the cart frame; and B. at least a first wheel extending from an underside of the lower base section;

wherein the upper material collection surface has a first material collection section at a first angle to the plane of the upper end of the collection bag passage and a second material collection section at a second angle to the plane of the upper end of the collection bag passage, the first angle being at least ten degrees greater than second angle and thee second material collection section abutting the upper end of the collection bag passage.

15. A portable collection cart comprising in combination:

A. a cart frame having:

an upper feed section having collection bag passage extending from an upper surface of the upper feed section to a lower surface of the upper feed section;

a lower base section;

at least three feed section support arms extending transversely from and between the lower base section and the upper feed section; and a stabilizer bracket mounted to each of the support arms transverse to the support arms and having opposed stabilizer bracket arms extending transversely outwardly from two adjacent feed section support arms, the two opposed feed section support arms, upper feed section, and lower base section cooperatively providing an open front side of the cart frame with the two adjacent support arms extending outwardly from the two opposed support arms at the opposed sides of the open front side of the cart frame; and B. at least a first wheel extending from an underside of the lower base section;

wherein the upper material collection surface has a first material collection section at a first angle to the plane of the upper end of the collection bag passage and a second material collection section at a second angle to the plane of the upper end of the collection bag passage, the first angle being at least ten degrees greater than second angle and thee second material collection section abutting the upper end of the collection bag passage.

16. A portable collection cart comprising in combination:

A. a cart frame having:

an upper feed section having collection bag passage extending from an upper surface of the upper feed section to a lower surface of the upper feed section;

a lower base section;

at least three feed section support arms extending transversely from and between the lower base section and the upper feed section; and a stabilizer bracket mounted to each of the support arms transverse to the support arms and having opposed stabilizer bracket arms extending transversely outwardly from two adjacent feed section support arms, the two opposed feed section support arms, upper feed section, and lower base section cooperatively providing an open front side of the cart frame with the two adjacent support arms extending outwardly from the two opposed support arms at the opposed sides of the open front side of the cart frame; and B. at least a first wheel extending from an underside of the lower base section;

wherein the upper material collection surface has a first material collection section at a first angle to the plane of the upper end of the collection bag passage and a second material collection section at a second angle to the plane of the upper end of the collection bag passage, the first angle being at least ten degrees greater than second angle and thee second material collection section abutting the upper end of the collection bag passage.

17. The portable collection cart of claim 1 wherein the upper feed section and lower base section are removably secured to the at least three feed section support arms, the stabilizer bracket is removably secured to the at least three support arms, the wheel is removably secured to the lower base section, and the stabilizer bracket is comprised of at least three stabilizer bracket sections, each stabilizer bracket section being removably secured in position on the collection cart.

18. The portable collection cart of claim 16 wherein the upper feed section and lower base section are removably secured to the at least three feed section support arms, the stabilizer bracket is removably secured to the at least three support arms, the wheel is removably secured to the lower base section, and the stabilizer bracket is comprised of at least three stabilizer bracket sections, each stabilizer bracket section being removably secured in position on the collection cart.

19. A collapsible portable collection cart comprising in combination:

A. a collapsible cart frame having:

an upper feed section having collection bag passage extending from an upper surface of the upper feed section to a lower surface of the upper feed section;

a lower base section;

at least three feed section support arms removably mountable transversely from and between the lower base section and the upper feed section; and a collapsible stabilizer bracket removably mountable to each of the support arms transverse to the support arms and having opposed stabilizer bracket arms extendable transversely outwardly from two adjacent feed section support arms, the two opposed feed section support arms, upper feed section, and lower base section removably mountable to cooperatively provide an open front side of the cart frame with the two adjacent support arms extending outwardly from the two opposed support arms at the opposed sides of the open front side of the cart frame; and B. at least a first wheel securable to an underside of the lower base section;

wherein an upper material collection surface of the upper surface has a first material collection section at a first angle to the plane of the upper end of the collection bag passage and a second material collection section at a second angle to the plane of the upper end of the collection bag passage, the first angle being at least three degrees greater than second angle and thee second material collection section abutting the upper end of the collection bag passage.

20. The collapsible portable collection cart of claim 19 wherein upper feed section, lower base section, the at least three feed section support arms, and the collapsible stabilizer bracket comprise plastic or composite material.

21. The portable collection cart of claim 1 wherein upper feed section, lower base section, the at least three feed section support arms, and the collapsible stabilizer bracket comprise plastic or composite material.

* * * * *